(12) United States Patent
Mead et al.

(10) Patent No.: US 6,366,826 B1
(45) Date of Patent: Apr. 2, 2002

(54) PUBLICATION DISTRIBUTION SYSTEM

(75) Inventors: Todd Mead, North Vancouver (CA); Wolfgang Griech, Heidenheim (DE); Edward W. Chapman, Hambin, NY (US)

(73) Assignee: Voith Paper Automation, Inc., Los Gatos, CA (US)

( * ) Notice: Subject to any disclaimer, the term of this patent is extended or adjusted under 35 U.S.C. 154(b) by 0 days.

(21) Appl. No.: 09/258,581

(22) Filed: Feb. 26, 1999

(51) Int. Cl.$^7$ ................................................ G06F 19/00
(52) U.S. Cl. ...................................... 700/128; 700/127
(58) Field of Search .................................. 700/127, 128

(56) References Cited

U.S. PATENT DOCUMENTS

| | | | |
|---|---|---|---|
| 4,680,753 A | * 7/1987 | Fulton et al. | 370/449 |
| 4,980,846 A | * 12/1990 | Chapman | 700/167 |
| 5,452,201 A | * 9/1995 | Pieronek et al. | 700/83 |
| 6,086,716 A | * 7/2000 | Watson et al. | 162/198 |

OTHER PUBLICATIONS

Cavalieri et al., Impact of fieldbus on communication in robotic systems, Feb. 1997, IEEE, vol. 13, issue 1, 30–48.*

* cited by examiner

Primary Examiner—Kevin J. Teska
Assistant Examiner—Chad Rapp
(74) Attorney, Agent, or Firm—Jerry G. Wright; Coudert Brothers, LLP

(57) ABSTRACT

A publication distribution system and, more specifically, a computer operated feedback control system for controlling a process such as a paper-making process includes an effective common data base to which Publisher and Subscriber means are connected. An actual Publisher and Subscriber data base allows for a once only subscription to link subscriber means to a selected publisher for transfer of only updated or changed data from the original. Thus, only changed data is transferred across a network and computational load is reduced significantly. In the specific context of the present invention, the Publisher may be a scanning sensor for basis weight of paper being manufactured by a paper-making machine and a Subscriber may be an actuator such as a headbox control unit.

2 Claims, 4 Drawing Sheets

PUBLICATION DISTRIBUTION SYSTEM

INTRODUCTION

The present invention is directed to a publication distribution system and, more specifically to a computer operated feedback control system for controlling a process such as a paper-making machine.

BACKGROUND

FIG. 1 illustrates a prior control process which while specifically related to the paper-making industry might occur in any type of computer control system where several sources of data (termed a Publisher) is desired by several Subscribers. As illustrated in FIG. 1, as specifically applied to the paper-making industry, there is a central computer 10 where in a star-type system having the data path 11, 12 and 13 all of which go to the input port, indicated generally at 14 of the computer. Thus, this may be a choke point or bottleneck in the system. On data line 13, a so-called Publisher in the form of sensors sense among other parameters of a paper-making process, moisture and basis weight. This is usually done by scanners which scan in a cross direction across the width of the paper being manufactured and provides data for every "slice" of the paper. Thus, for every scan there is a significant data output. To control moisture and basis weight to desired set points and provide quality control, the feedback control system and computer 10 receives this data and by the use of actuators 17 and 18 on the data lines 11 and 12 individually control basis weight (for example, the headbox openings of the paper-making machine are controlled) or moisture (see actuator 18). Moisture may be controlled in several ways by controlling steam valves or actually spraying water on the paper sheet. In addition, there are other parameters such as caliper and gloss of the paper which can be controlled in the same feedback control manner. Thus, in summary with the prior art star system of FIG. 1 there is a large amount of data going to the central computer and a single node of the computer must listen to all of the communications coming from each of the legs of the star, that is, 11, 12 and 13. And in the case of sensors 16 since data is normally polled, the whole array of data is transferred; that is, for each scan an entirely new array of data must be transferred and processed.

OBJECT AND SUMMARY OF INVENTION

It is therefor a general object of the present invention to provide an improved publication distribution system.

In accordance with the above object, there is provided a computer operated feedback control system for controlling a process comprising an effective common data bus. A plurality of Publisher means is connected to the data bus for sensing a variable parameters of the process and respectively storing data related to such parameter. A plurality of Subscriber means is connected to the data bus for receiving data from a selected Publisher means. Means are provided for transmitting to the Subscriber means from the selected Publisher means only that portion of data which has been changed from a value prior in time.

DESCRIPTION OF PREFERRED EMBODIMENTS

Figure 1:
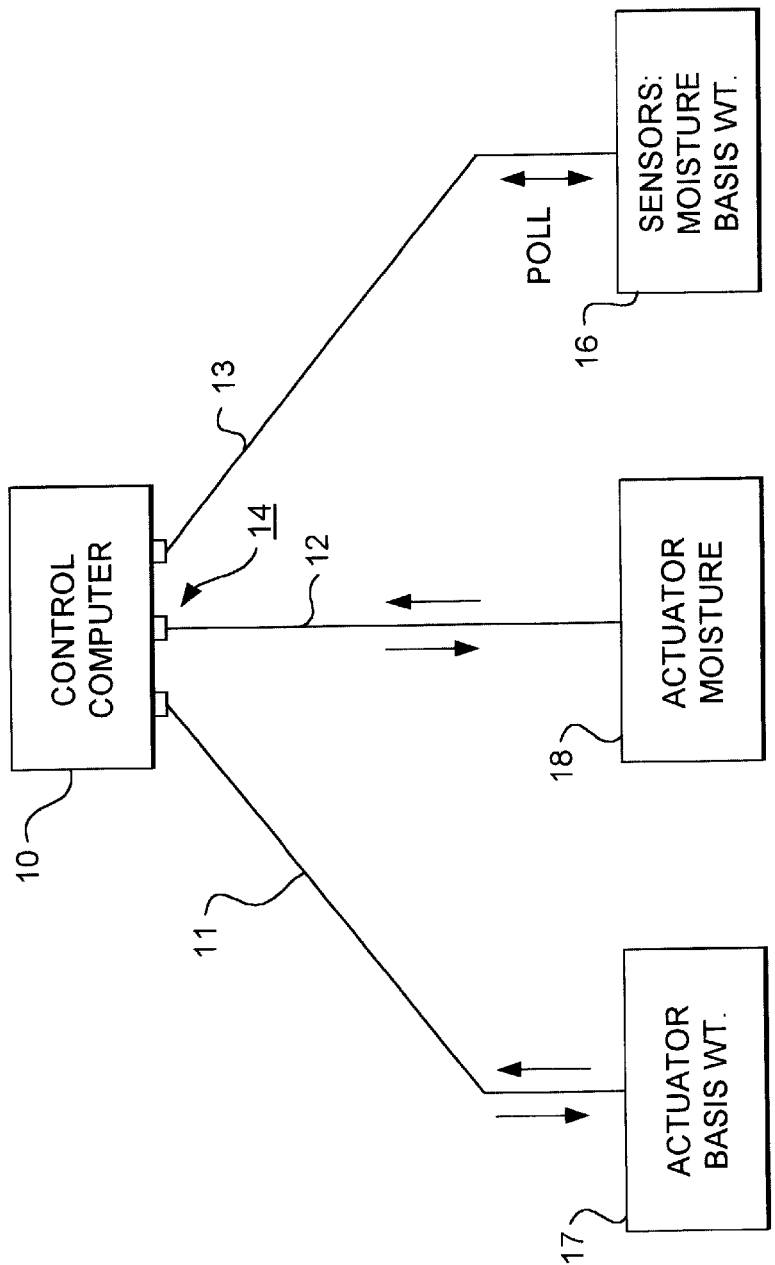
FIG. 1 is a block diagram of a prior art star data system.
Figure 2:
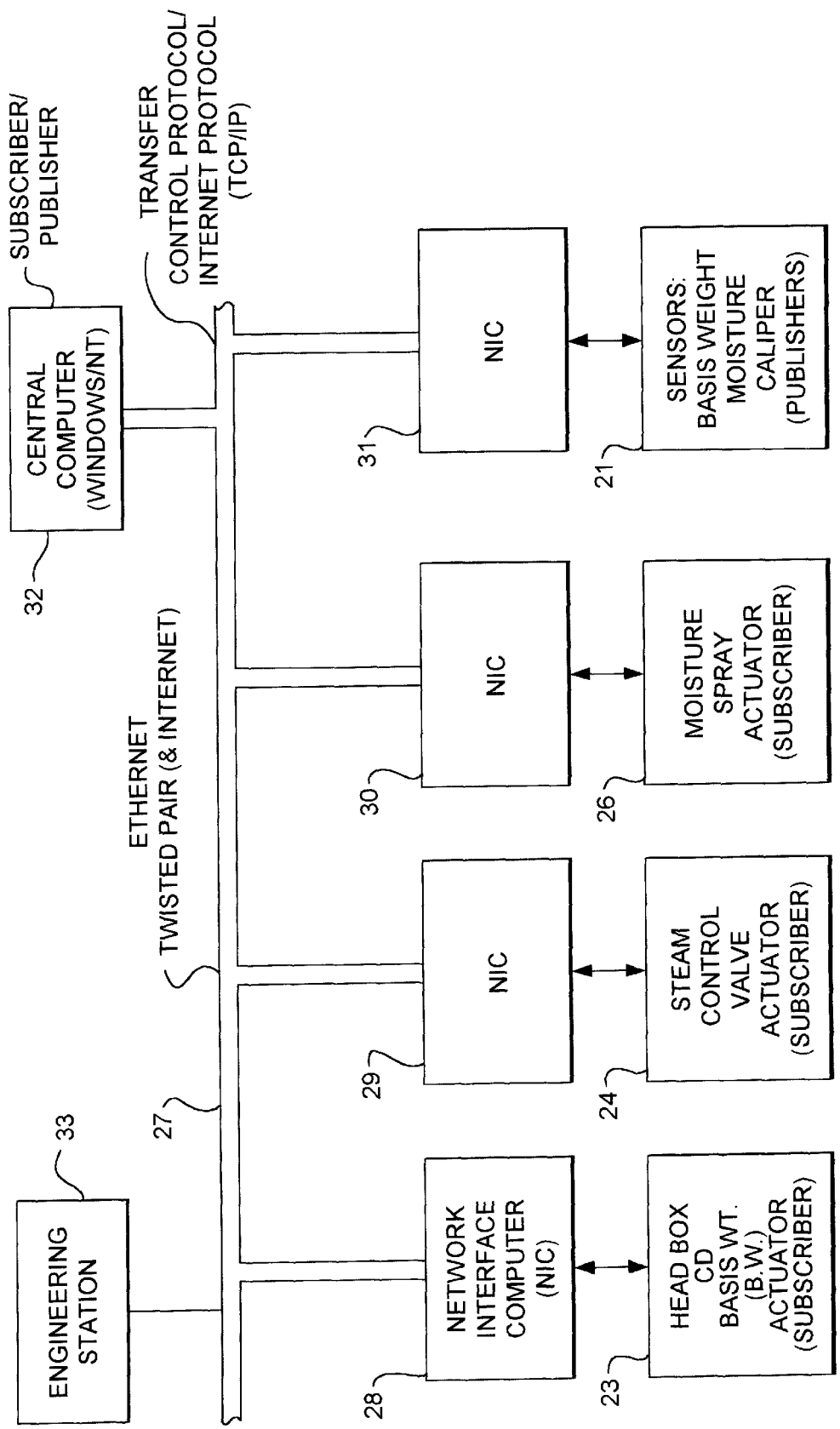
FIG. 2 is a block diagram embodying the system of the present invention.
Figure 5:
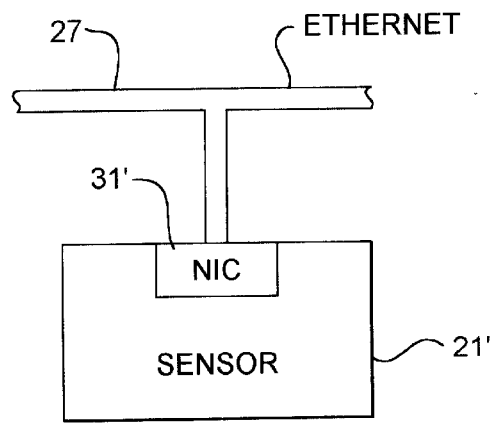
FIG. 5 is a variation of a portion of both FIGS. 3 and 4.

Referring now to FIG. 2, this is a typical context in which the present invention is used. Specifically, it is in conjunction with a paper-making machine where several parameters are sensed, as shown in block 21, such as the basis weight, moisture and caliper of the paper being manufactured. It is well-known that variable parameters in the paper-making process must be controlled to a desired set point. Controllers in the paper-making process are termed actuators. As illustrated in blocks 23, 24 and 25, they are respectively a headbox cross direction actuator for controlling basis weight, a steam control valve for controlling one aspect of moisture at one place in the process and a moisture spray actuator 26 for again controlling moisture at another place in the process. In this embodiment, each actuator and sensor is connected to a data bus 27 which in this specific instance is an Ethernet twisted pair which is connected on by the proper protocols to the Internet. Thus, the Internet protocol such as TCP/IP is indicated which is the transfer control protocol/ Internet protocol. The Internet connection would be used for other than a so-called local (that is, a single paper-making machine location) connection. Sensors 21 and actuators 23, 24 and 26 are all connected to the twisted pair 27 via respective network interface (NIC) computers 28 through 31. The NIC computers are shown separately but theoretically could be an integral part of, for example, an actuator or sensor as shown in FIG. 5 with the NIC 31' being an integral part of a sensor 21' and then being connected directly to the Ethernet data bus 27.

Finishing the block diagram and the system of FIG. 2, also connected to data bus 27 is a central computer 32 which, for example, may operate on Windows/NT system basis. And then at 33, there is an engineering station also connected to data bus 27 for retrieving information. Then, as discussed above, the Ethernet twisted pair 27 may also be part of an overall Internet global data system and accessed from foreign or non-local computer stations.

As discussed above, although a feedback control loop for a paper-making system is shown in FIG. 2 where large volumes of scanned data are provided by the sensors 21 which is then acted upon by the actuators 23, 24, 26, the present invention is applicable to any type of generalized publication distribution system (PDS) where a large volume of data is published. Thus, the block 21 is designated Publisher, and must be acted upon by various Subscribers, blocks 23, 24 and 26. In addition, the central computer 32 may serve as either a Subscriber or a Publisher. For example, it is a Publisher when, for example, new set point data is to be installed in the NIC computers 28 through 31. Central computer 32 may be a remote computer to control the systems remotely. Similarly, engineering station 33 serves as a data output for the operator of the system.

Thus, in a more generalized sense the publication distribution system (PDS illustrated in FIG. 2) is made up of a set of network processes, controlled by computers, that work together to provide a mechanism of delivering published data to those who subscribe for such data in an event driven rather than poll driven way. All data will be published to the PDS, but will not be stored there, but rather sent there for delivery. All users of the data will subscribe to the PDS for this data, and will be notified every time the Publisher updates the data; that is, when the data is changed from a prior value. A given user of the published data (Subscriber) will be able to submit requests to change the data by sending updates to the PDS, which will in turn pass the request back to the Publisher. Publishers and Subscribers will not need to memorize who is subscribed to, or who has published data, but instead can concentrate on the data they require. In this way, fault tolerance becomes an inherent part of the PDS, relieving the Publishers and Subscribers of this drudgery and complexity. Note that, any given network process can act as both a Publisher and Subscriber; hence, the terms Publisher and Subscriber describe the given state of a given network process, not the entire process itself.

Figure 3:
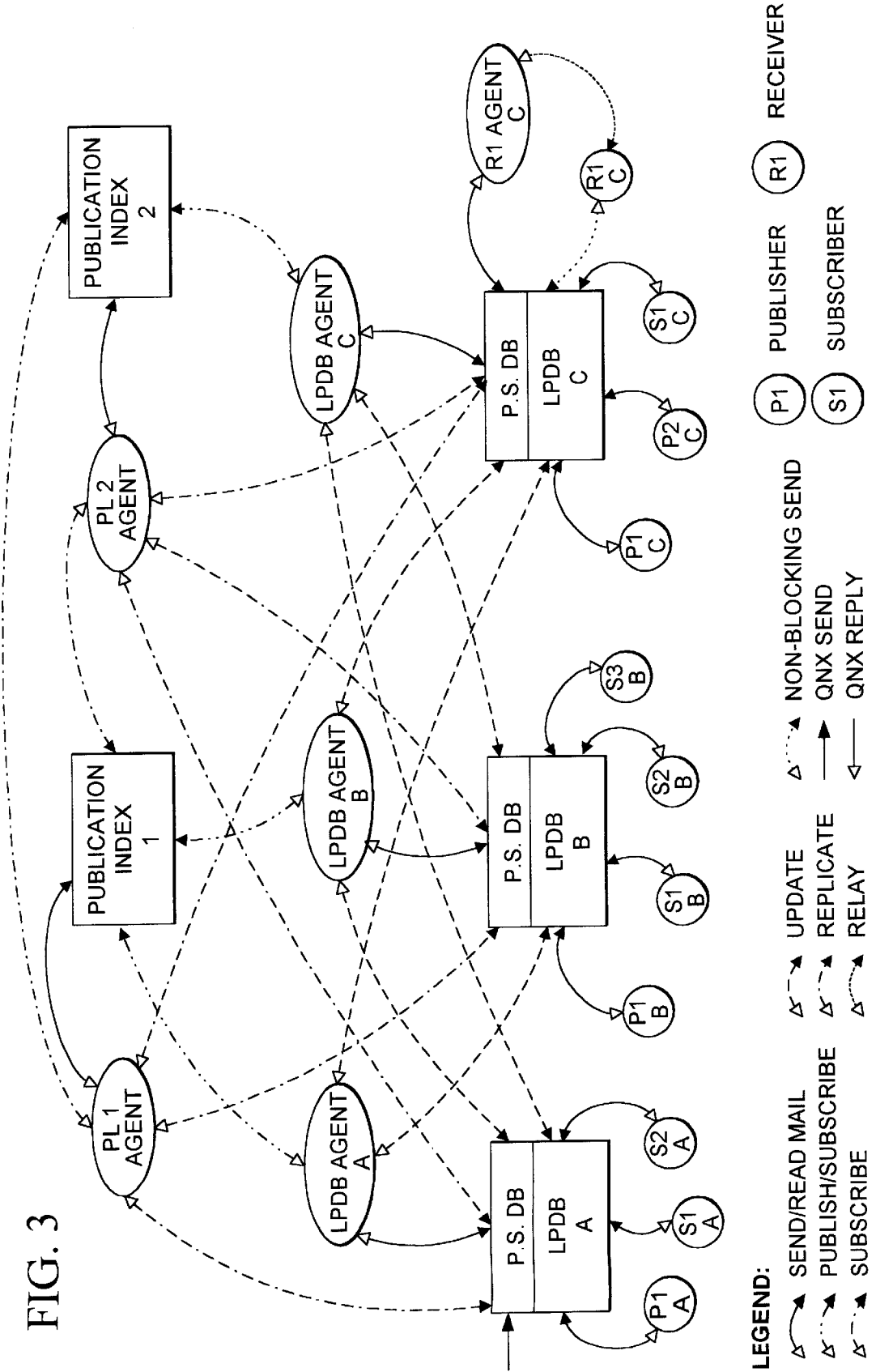
FIG. 3 is a conceptual schematic in the form of a state diagram illustrating the various processes and software computer programs embodying the present invention.

The operation of FIG. 2 is (and, in fact, a more generalized publication distribution system) is illustrated by the system or state diagram of FIG. 3. Here, the legends illustrate the various data flow paths and their function and include for a Publisher a circled P1 and for a subscribe a circled S1. The various blocks are computer or software implemented processes as will be described below, specifically relating to FIGS. 2 and 3. Thus, Subscribers S1 A and S2 A, represent the actuators 23, 24 and 26. The Publisher 21 is represented by P1 A and the various process software is located in the NIC computers 28 through 31 (and may also be in other locations).

Following is a glossary describing the various processes.
Local Publication Database (LPDB)

The LPDB is the core local process in which all data is published/updated and to where all subscriptions for data are made. No data is ever permanently stored in the LPDB; rather, data is simply routed to its final destination based on subscriptions for the data. Hence, the LPDB is a database containing publication and subscription information for a set of local users, not a database of the actual data itself. It is always receive blocked.

LPDB Agent

Since, the LPDB is ALWAYS receive blocked, the LPDB Agent is simply a small relay process used to relay LPDB messages to other LPDB processes as well as Publication Index servers on the network.

Publication Index

The Publication Index contains a master network wide list of all publications and subscriptions. The LPDB processes will notify the Publication Index of all publications and subscriptions. At least one Publication Index process must run on the network; however, several may run for fault tolerance and load balancing reasons on larger networks. There will be no master Publication Index on the network as all Publication Index processes will work concurrently to serve their LPDB processes. Every Publication Index will tell every other Publication Index processes about their publications and subscriptions. Note that, generally, even in a large network environment, only two or three Publication Index processes need be running.

PI Agent

Like the LPDB, the Publication Index is ALWAYS receive blocked, the PI Agent is simply a small relay process used to send messages on behalf of the Publication Index.

Publisher

A Publisher is a process that owns certain data that is to be published into the PDS. A process needing to publish data to the PDS, must first login to a LPDB. Typically, this LPDB will reside on the same node as the Publisher, After login, the Publisher can publish and update for use by Subscribers.

Subscriber

A Subscriber is a process that does not own a certain piece of data, but needs to know what this data is and when this data changes. Like a Publisher, a process needing to subscribe for data via PDS, must first login to a LPDB. Again, typically this LPDB will reside on the same node as the Publisher. After login, the Subscriber can subscribe for data it is interested in, and will be notified when the Publisher updates this data.

Receiver

A Receiver, is a process, that can act as a Publisher or Subscriber (or both), that cannot remain Send( ) blocked on its LPDB. Examples would include processes needing to act in a classical QNX fashion to Receive( ) messages from other QNX process outside of the PDS scope such as Photon or QNX Windows. Another example could be a process using TCP/IP to communicate that may need to be constantly listening to its socket connections.

Receiver Agent

A Receiver process will need to have a partner known as a Receiver Agent. Both the Receiver and the agent will share the same login identifier. The agent will remain send blocked on the LPDB, waiting for PDS messages, and will relay such messages to the Receiver using what ever mechanism the Receiver and the agent agree upon (for example, QNX messaging vs. TCP/IP).

The above PDS implementation details are hidden from the PDS client processes. A PDS client process simply chooses an LPDB to login to and then creates the publication and subscriptions it requires. The PDS in its simplest form would consist of only an LPDB and the associated client processes. The Publication Index and related processes are only required with multiple LPDB processes in a large network environment need to communicate. To all PDS client processes, the interface to the PDS remains the same regardless of whether the PDS is running in its simplest form or if the PDS is running in the more complex large network environment.

The term receive block or send block, which is indicated by ( ) is that, for example for the LPDB which is always received block, it is always open to receive; in other words, no intermediate action must be taken before the next reception occurs. This is because as stated above all subscriptions for data are made here (see the publications and subscriber data base PSDB as a part of each LPDB process). Then, reply block means that a task is suspended until a reply is received.

The following data flow diagram indicates how a publisher, for example P1 A, would operate with a network subscriber, for example S1B.

Publish( ), network Subscriber
1) P1 A→LPDB A
   Send( )
     Publisher, Publication String
   Reply( )
     Publication Handle A
2) LPDB A→LPDB Agent A
   Reply( )
     Msg: Relay
     Who: Publication Index 1
     What: Publisher, Publication String, Publication Handle A
3) LPDB Agent A→Publication Index 1
   Send( )
     Publisher, Publication String, Publication Handle A
   Reply( )
     Acknowledgement
4a) Publication Index 1→PI Agent 1
   Peply ( )
     Msg: Relay
     Who: LPDB B What: Subscriber, Publication Handle A
4b) Publication Index 1→PI Agent 1
Reply( )
  Msg: Relay
  Who: LPDB A
  What: Subscriber, Publication Handle A, Subscription Handle B
4c) Publication Index 1→PI Agent 1
Reply( )
  Msg: Relay
  Who: Publication Index 2
  What: Publisher, Subscription Handle A
5a) PI Agent 1→LPDB B
Send( )
  Publisher, Subscription Handle A
Reply( )
  Acknowledgement
5b) PI Agent 1→LPDB A
Send( )
  Subscriber, Publication Handle A, Subscription Handle B
Reply( )
  Acknowledgement
5c) PI Agent 1→Publication Index 2
Send( )
  Publisher, Publication String, Publication Handle A
Reply( )
  Acknowledgement
6a) LPDB B→S1 B
Reply( )
  Msg: Publisher Found
  What: Subscription Handle B
6b) LPDB A→P1 A
Reply( )
  Msg: Subscriber Found
  What: Subscription Handle A
7) P1→LPDB A
Reply( )
  Msg: Update
  What Subscription Handle A+Data
8) LPDB A→LPDB Agent A
Reply( )
  Msg: Relay
  Who: LPDB B
  What: Subscription Handle B+Data
9) LPDB Agent A→LPDB B
Send( )
  Update, Subscription Handle B+Data
Reply( )
  Acknowledgment
10) LPDB B→S1 B
Reply( )
  Msg: Update
  What: Subscription Handle B+Data
NOTE:
  5b)→6b)
    Publication Handle A+Subscription Handle B→Subscription Handle A
  7)→8)
    Subscription Handle A→Subscription Handle B See step 6a. Note the ( ) after send and reply to indicate they are blocked. Furthermore, as indicated in, for example step 1 "Publication Handle A", is a short way of describing that particular file. With respect to the Receiver and Receiver Agent functions (see in FIG. 3, R1 Agent C and R1 C), these are more peripheral applications outside the general scope of the publication distribution system when applied to feedback control process, for example.

Most importantly, however, the data flow diagram illustrates in the beginning of step 7 how the Publisher of data, for example, an actuator is illustrated in FIG. 2, transmits only new or updated data, that is, data that has been changed from a prior historical value in time. See steps 9 and 10 where the actual update takes place. This is an important concept of the present invention to eliminate the unnecessary transmission of unchanged data and thus eliminate bottlenecks in the system which would otherwise slow it; and this is especially critical in a feedback control context.

Figure 4:
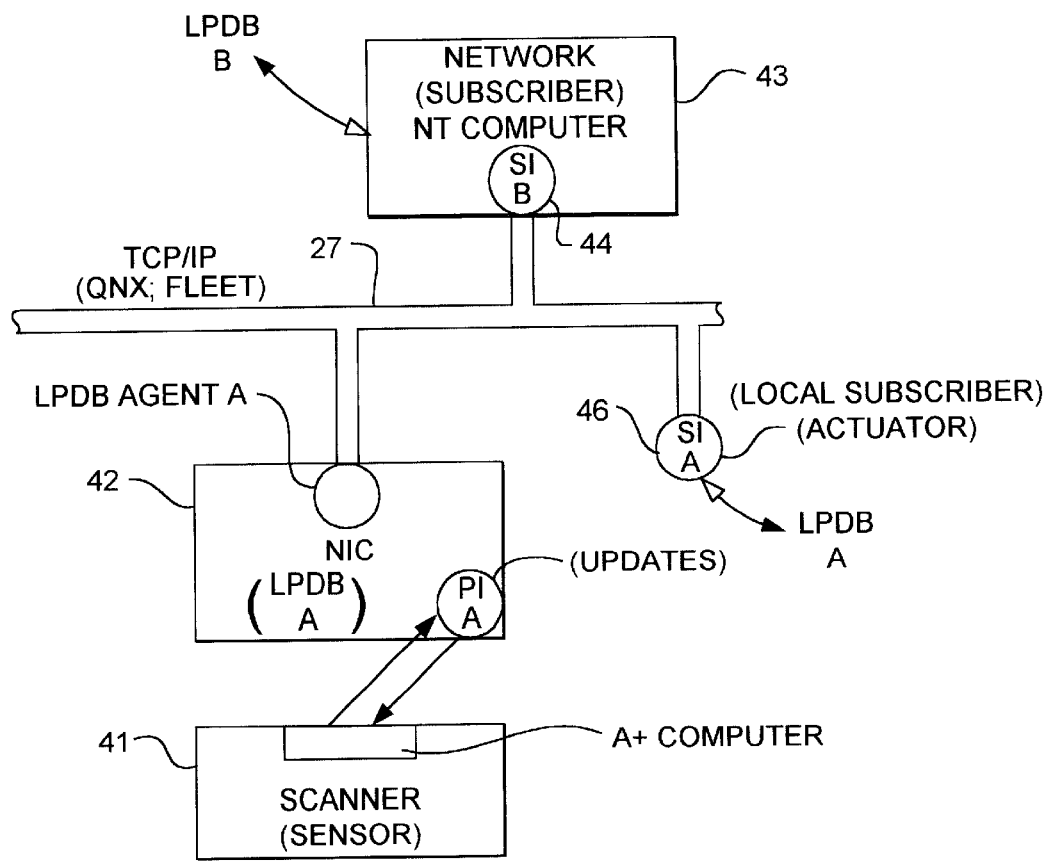
FIG. 4 is a simplified form of FIG. 3.

The actual operation of the publication distribution system in a simplified form is illustrated in FIG. 4. Here, is a single scanner sensor 41 with an embedded A-plus computer for storing data (this would not be necessary if the associated NIC 42 were embedded in it, see FIG. 5) which, for example, may be scanning in the cross direction across the paper sheet to indicate basis weight. All of the scanned data is contained in the A-plus computer but the P1 A Publisher Program transmits updates only. Continuing with the general system, there is the data bus 27 and then an NT network computer 43 which may be connected to, referring briefly to FIG. 3, the Subscriber S1 B process as indicated at 44. Then, a local (at the same node) Subscriber actuator S1 A at 46 completes the control feedback loop in response to updates or changes received from scanner 41. More specially, the NIC computer 42 runs on a QNX system which is related to a Fleet protocol. Thus, a Fleet message is converted to an Ethernet message which is then sent to the NT computer 43. The NT computer 43 is linked to a Subscriber S1 B (44). That software talks to the NIC computer 42 which is part of the LPDB A. This local publication data base will receive raw data from the Publisher P1 A which in turn gets its data from the scanner. The software of P1 A effectively communicates with the LPDB that it is a Publisher and has data and, if any one has subscribed to it, it should be sent to them. Note, that the LPDB A as illustrated in FIG. 3 has a publication and subscriber data base where a Subscriber previously signed up. As indicated, there is a Subscriber S1 B along with the actuator S1 A. The Subscriber S1 B effectively states "give me all of your end-of-scan data every time there is updated or new data. The subscription, of course, has been registered in the publication and subscriber data base.

If one piece of data, for example, for the basis weight of a particular slice of paper has changed, a message is sent to the LPDB by the Publisher (P1 A) that there is one piece of data that is different. A message is then sent from the LPDB A that there is new updated data. It is assumed in this process that, for example, the NT computer 43 at the beginning of the process has, of course, acquired all of the scanned data since initially it will all have been changing. One of the important functions computer 43 can accomplish after it has performed its Subscriber function (via S1 B) is to act as a Publisher. For example, basis weight data could be filtered and then republished as filtered basis weight which can then be the nominated conditioned weight which is really the equivalent weight with a standard moisture of 8%. So the computer 43 can then publish a conditioned weight profile. At the same time, it could change the set point on which the actuator 46, which is the local Subscriber, acts. The so-called Fleet protocol is a type of TCP/IP protocol that is specifically proprietary to QNX which is a proprietary company name. It is ideal for use in distributive computing applications where memory locations are shared between computers. It is also very suitable for implementing mathematical operations in a large array of data, for example, fast Fourier transform. Concluding the discussion of FIG. 4, the data flow diagram of above with the steps 1 through 10 would apply.

With the above publication distribution system, the actual local publication data base does not own or have copies of any data. This is an unique aspect of the invention. Normally, a data base has possession of the data and it takes physical memory to store the data that is collected by a Publisher. Thus, one must keep track of who has the most recent copy on a real-time system. In the present invention, there is no copy outside of, for example, the scanner sensor 41 as illustrated in FIG. 4 and the Publisher P1 A. As illustrated, this amounts to two copies. However, as is illustrated in FIG. 5, when an NIC is merged in a sensor unit, only one copy of the entire data is necessary; in essence, the only copy is owned by the data source or scanner or the Publisher.

Now again referring to the generalized flow chart or state chart of FIG. 3, this also includes a local publication data base agent. This is used in the Fleet protocol to transfer Fleet messages into TCP/IP messages to communicate to the NT computers. Thus, the agent transfers one protocol to another for proper interfacing. Then, the agent handles any timing issues with the Subscriber's dealing with busy and interrupting. This is necessary to implement the operation of the system to ensure that the messages are delivered.

Still referring to FIG. 3, there are three fundamental ways that computer tasks communicate. As illustrated in the legend, there is a non-blocking send, a normal send and a reply. These are implemented by the proprietary QNX demands. Also, fully illustrated in FIG. 3 are the multiple data path interconnections of different types of the three LPDB agents A, B and C. Note, that each agent has a send/read mail, a published/subscribe, and an update connection from all of the local publication data bases A, B and C. They are also linked to respective Publication Indexes 1 or 2.

When the system is initialized, of course, although all data is normally transmitted by exception meaning only changes are transmitted, an initial registration occurs the very first time that the current data array is transferred. After that, only exceptions are transmitted. In summary, the overall advantage of the system is that it reduces computational load dramatically by orders of magnitude because it is only critical information that goes across the network, that is, only those messages which contain changed or updated data.

What is claimed is:

1. A computer feedback system for controlling a papermaking machine process where variable parameters including basis weight and moisture are measured by repeated scanning of the sheet in a cross-direction to create an array of data for each scan comprising:

an effective common data bus;

a plurality of publisher means connected to said data bus for sensing said variable parameters;

means for transmitting to one of a plurality of subscriber means from a selected publisher means only that portion of a data scan which has been changed from a prior scan; and a plurality of subscriber means connected to said data bus for receiving changed data from a selected publisher means said subscriber means including controller and actuator means for responding to said changed data to control a selected said actuator means.

2. A system as in claim 1 including publisher and subscriber database means for linking said subscriber means to said selected publisher means for transfer of data.

* * * * *